(12) United States Patent
Langlois

(10) Patent No.: US 10,315,737 B2
(45) Date of Patent: Jun. 11, 2019

(54) FLUID HINGES FOR TRIM TAB CONNECTIONS

(71) Applicant: Joseph R Langlois, Coral Springs, FL (US)

(72) Inventor: Joseph R Langlois, Coral Springs, FL (US)

( * ) Notice: Subject to any disclaimer, the term of this patent is extended or adjusted under 35 U.S.C. 154(b) by 0 days.

(21) Appl. No.: 15/617,365

(22) Filed: Jun. 8, 2017

(65) Prior Publication Data

US 2017/0320553 A1 Nov. 9, 2017

Related U.S. Application Data

(63) Continuation-in-part of application No. 14/997,244, filed on Jan. 15, 2016, now abandoned, and a continuation-in-part of application No. 15/474,050, filed on Mar. 30, 2017, now Pat. No. 10,005,527.

(51) Int. Cl.
| | |
|---|---|
| *B63B 39/06* | (2006.01) |
| *F16M 13/02* | (2006.01) |
| *B63B 1/22* | (2006.01) |
| *B63B 1/20* | (2006.01) |
| *B63B 1/32* | (2006.01) |

(52) U.S. Cl.
CPC ............. *B63B 39/061* (2013.01); *B63B 1/20* (2013.01); *B63B 1/22* (2013.01); *B63B 1/32* (2013.01); *F16M 13/02* (2013.01); *B63B 2039/065* (2013.01); *Y02T 70/12* (2013.01)

(58) Field of Classification Search
CPC .. B63B 1/20; B63B 1/22; B63B 35/85; B63B 35/79
USPC ........................................................ 114/285
See application file for complete search history.

(56) References Cited

U.S. PATENT DOCUMENTS

| 4,909,175 A | * | 3/1990 | Arneson | B63B 39/061 |
| | | | | 114/285 |
| 7,188,581 B1 | * | 3/2007 | Davis | B63B 39/061 |
| | | | | 114/285 |
| 9,573,655 B1 | * | 2/2017 | Pigeon | B63B 1/20 |
| 9,643,697 B2 | * | 5/2017 | Sheedy | B63B 1/26 |
| 9,669,903 B2 | * | 6/2017 | Gasper | B63B 1/242 |
| 9,694,873 B2 | * | 7/2017 | Gasper | B63B 1/32 |
| 9,802,684 B2 | * | 10/2017 | Sheedy | B63B 35/85 |
| 2017/0137089 A1 | * | 5/2017 | Wood | B63B 1/22 |
| 2017/0203820 A1 | * | 7/2017 | Langlois | B63B 39/061 |
| 2017/0253306 A1 | * | 9/2017 | Langlois | B63B 39/061 |
| 2017/0320553 A1 | * | 11/2017 | Langlois | B63B 1/32 |

* cited by examiner

*Primary Examiner* — Lars A Olson
*Assistant Examiner* — Jovon E Hayes
(74) *Attorney, Agent, or Firm* — Melvin K. Silverman

(57) ABSTRACT

A fluid hinge includes a first part of a two-part element including a planar surface of a trim tab and a second part of the two-part system having at least one bracket secured to the hull of a watercraft and the first and second parts of the two-part element are not physically coupled together. It also provides at least one bracket secured to the hull on which the planar surface of the trim tab may rest and the at least one bracket not taking any load from the planar surface except at rest to keep the planar surface from descending below the horizon of the hull.

8 Claims, 19 Drawing Sheets

FLUID HINGES FOR TRIM TAB CONNECTIONS

This is a Continuation-in-Part application under 35 U.S.C. 120 of the presently co-pending patent application Ser. No. 14/997,244 filed on Jan. 15, 2016. Additionally, this also is a Continuation-in-Part application under 35 U.S.C. 120 of the presently co-pending patent application Ser. No. 15/474,050 filed on Mar. 30, 2017. This patent application is a continuation-in-part of both the original and the most recent patent applications.

FIELD OF INVENTION

The present invention relates to an improvement in classical trim-tab technology to enhance the general hydrodynamic performance of a marine craft inclusive of the fuel efficiency thereof. Trim tabs have been known for many years and various forms of them have been developed in an effort to maximize attitude control, stability of the marine craft and general hydrodynamic efficiency inclusive of decrease of flow velocity under the hull and fuel efficiency.

BACKGROUND OF INVENTION

So called boat leveling devices of the trim tab type have been known for many years and various forms of them have been developed in an effort to maximize attitude control, stability of the marine craft and general hydrodynamic efficiency inclusive of decrease of flow velocity under the hull and fuel efficiency.

The prior art trim tabs are typically provided in pairs to enhance stability of the craft, which are attached directly to the transom of a watercraft and in which the attitude of the trim tab is controlled through a hydraulic piston assembly which controls relative angulation of the whole relative to level of the water.

In general trim tabs of the prior art, whether double or single acting, will operate upon the same principles and have a common objective, namely, that of contributing to the efficiency control of the boats attitude, stabilization and general hydrodynamics.

In recent years, most efforts of the prior art have been directed primary to improvement of the electronics in the development of algorithms to optimize trim tab control under various conditions of speed, shape of the boat's hull, having distribution in craft, and other hydrodynamic considerations. The prior art also has experimented with the efficiency of electric motor controls of the trim tab as opposed to that of the hydraulic systems.

The trim tabs of the prior art contain a trim tab secured to the hull or transom of a boat with a fixed hinge. When this hinge is fixed, it requires the actuator to be mounted on an angle other than 90 degrees. Placement difficulties arise when the trim tab is mounted under the hull, rather than to the transom of the boat. A need exists for a fluid hinge that allows an actuator to be secured to the transom of the boat, while offering a non-fixed connection of the front of the planar surface of the trim tab to the hull of the boat.

SUMMARY OF THE INVENTION

A fluid hinge includes a first part of a two-part element comprising a planar surface of a trim tab and a second part of the two-part system having at least one bracket secured to the hull of a watercraft and the first and second parts of the two-part element are not physically fixed together. It also provides at least one bracket secured to the hull on which the planar surface of the trim tab may rest and the at least one bracket not taking any load from the planar surface except at rest to keep the planar surface from descending below the horizon of the hull.

It is accordingly an object of the present invention to provide an improved trim tab system which overcomes the various hydrodynamic limitations of the prior art, also having utility with leisure as well as naval vessels.

It is another object of the invention to provide a trim tab system capable of inducing a greater change in bow-to-stern or glide angle angulation of the marine craft relative to the water level while increasing the fuel efficiency thereof.

It is a yet further object to provide a system of the above type which furnishes improved accuracy of adjustment versus prior type of trim tab stern flap systems.

It is a still further object to provide a system to improve the degree and control of the glide angle of the watercraft and its ability to correct uplift zones to facilitate a more favorable weight distribution, each resulting in reduced fuel costs.

The present invention therefore seeks to provide more effective trimming coupled with the greatest possible uplift and lowest water resistance values, both at slow and high speeds, in a manner that does not substantially complicate the kinematics of prior art attitude control systems.

In addition a variety of different fluid hinges are shown herein.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIGS. 3, 3A, and 3B are a view of the different parts of a Type-42 Fluid Hinge including the flange and ears of the bracket.

FIGS. 8 and 8A are a side view of a Type-52 focused on the parts of the fluid hinge.

DETAILED DESCRIPTION OF THE INVENTION

The "fluid hinge" refers to a non-fixed connection between the planar surface and the hull of the watercraft. The term "non-fixed" refers to the properties of the fluid hinge that allow the planar surface to rest at low or no speed, but does not restrict the motion needed from the movement of the planar surface between raised and lowered positions of the rear of the trim tab, and further, the fluid hinge is not physically fastened to the planar surface.

Figure 1:
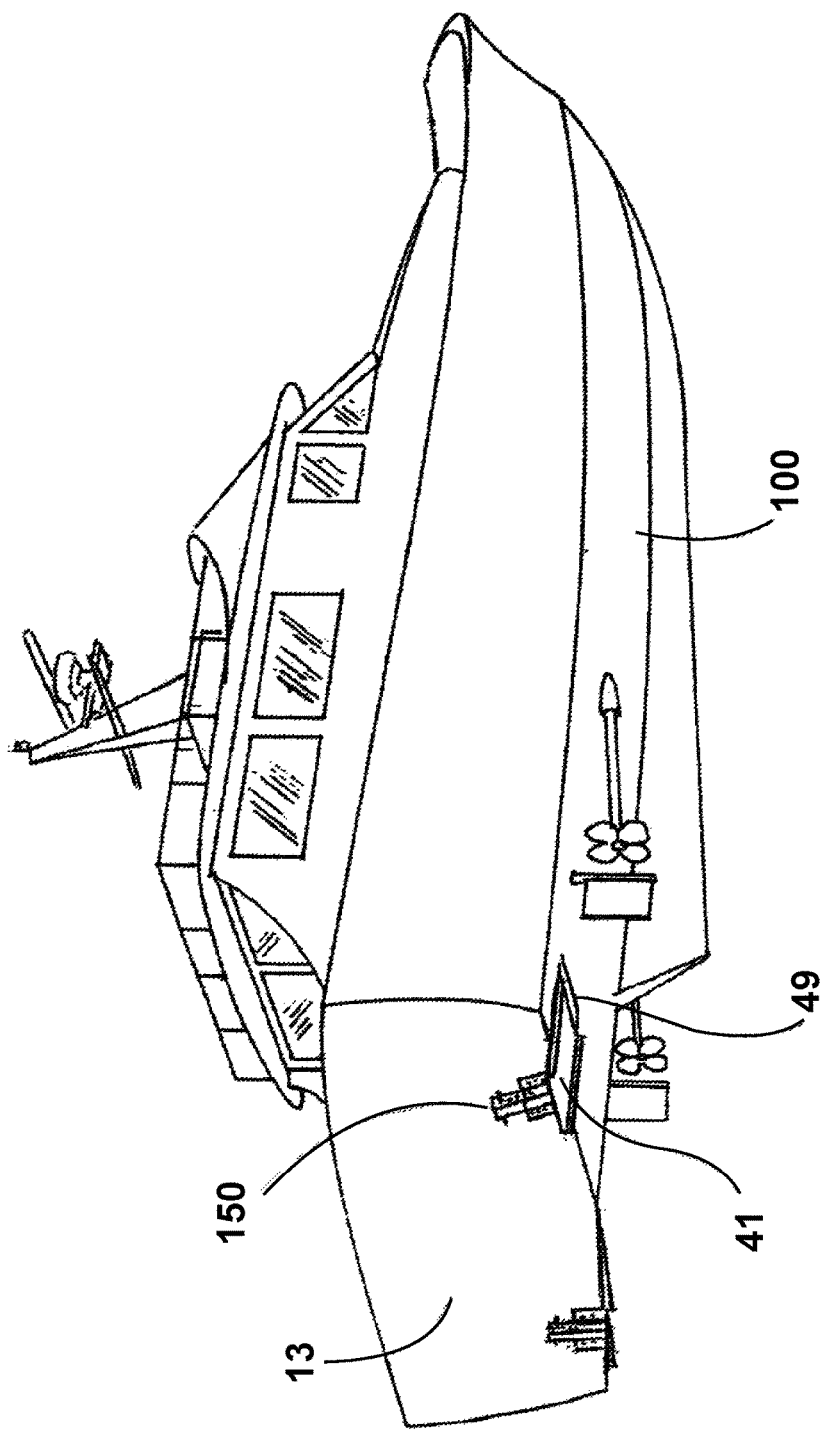
FIG. 1 is an isometric view from the rear of a generic watercraft showing the placement of trim tabs.

FIG. 1 is an isometric view of a generic watercraft showing the placement of two fluid hinges 49 in combination with trim tabs 41 substantially under the rear portion of the hull 100; one on the port side, and one on the starboard side. "Substantially" refers to the positioning as shown in FIG. 1, where the tabs may be mostly under the hull, but stick out slightly in order to provide extra space for a connection to an actuator.

Figure 2:
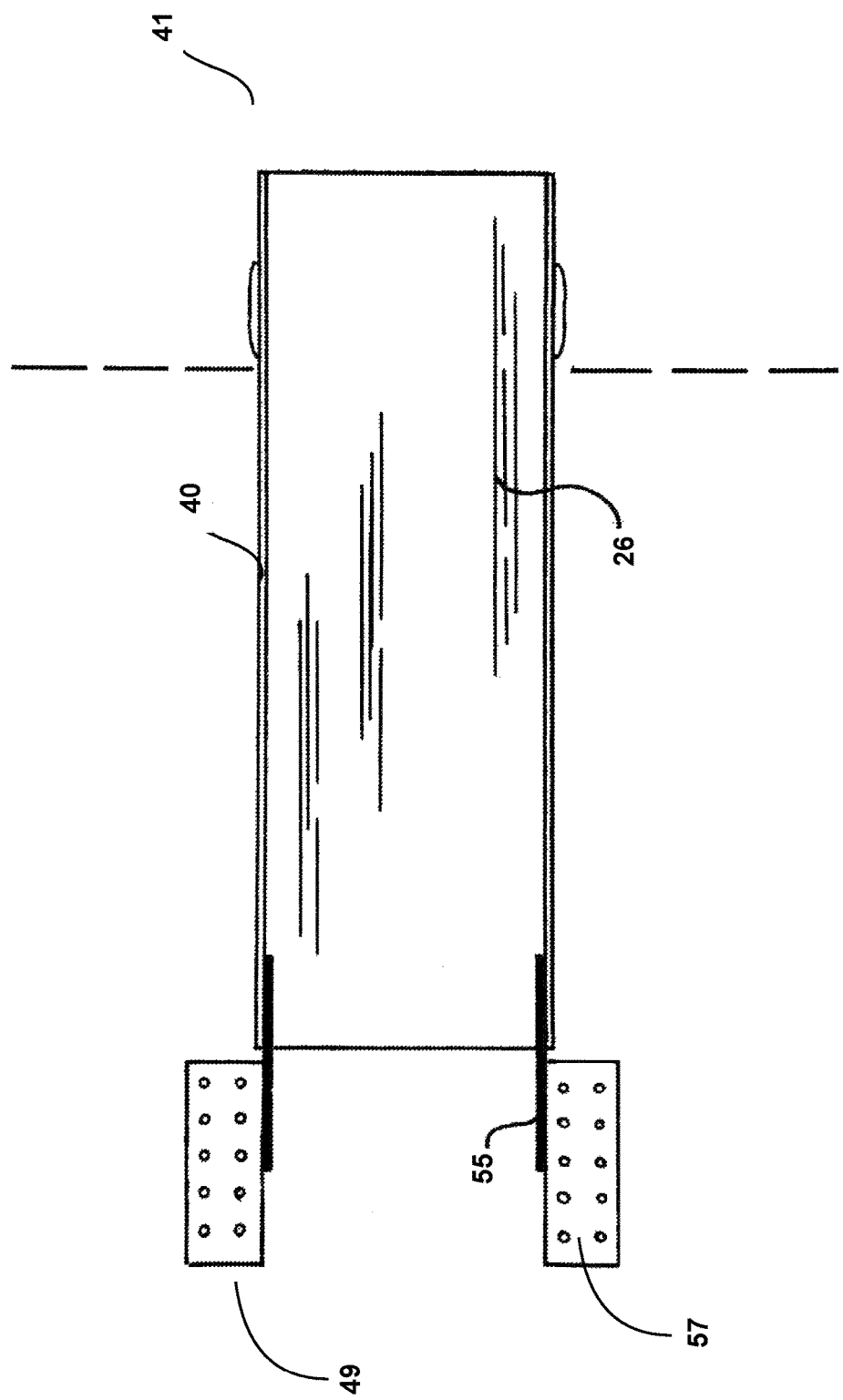
FIG. 2 is the under side of a version of a Fluid Hinge Type-42.
Figure 3:
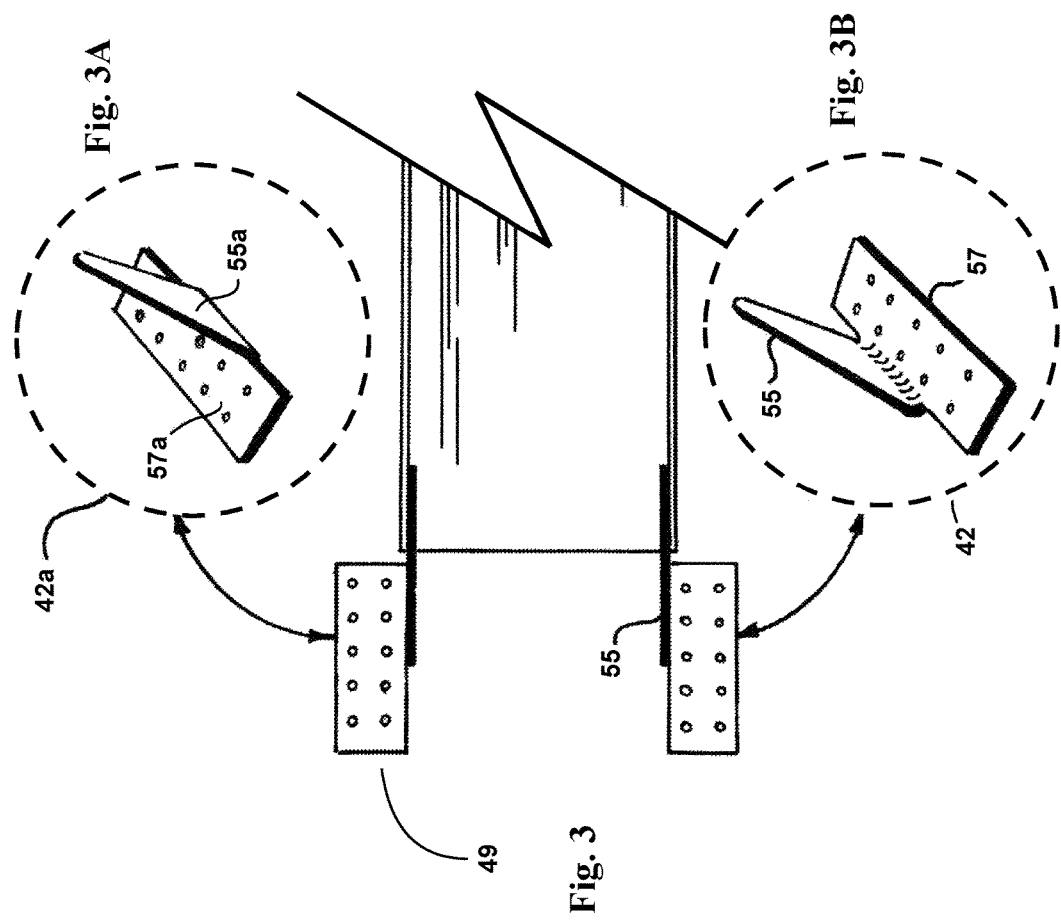

FIG. 2 shows the underside of the trim tab 41 using a version of a fluid hinge Type-42 and its components thereof. The fluid hinge Type-42 is comprised of a bracket 57 with an ear 55 that extends away from the hull 100, further shown in FIGS. 3, 3A, 3B, 4, 5, and 6. As shown in FIGS. 3, 3A, 3B, 4 and 5, a set of two brackets 57/57a connects to the hull 100 to support the trim tab 41. The ears 55 rest against linear-support-tabs 40, but are not physically fixed together. Instead, the hinge provides support for the planar surface at rest as shown in FIG. 5 to keep the trim tab from descending below a plane parallel to the horizon of the hull. When the watercraft is moving, the pressure of the water against the planar surface pushes the trim tab against the hull, thus negating the need for a fixed hinge. An actuator 150 connects the rear of the planar surface 26 to the transom 13 of the watercraft. This actuator is used to raise and lower the trim tab 41. The specific features of the actuator may vary, as any generic actuator would work. It is recommended that the actuator be mounted as close to a 90 degree angle as may be able to void the planar surface 26 from slipping to far away from the fluid hinge.

Figure 4:
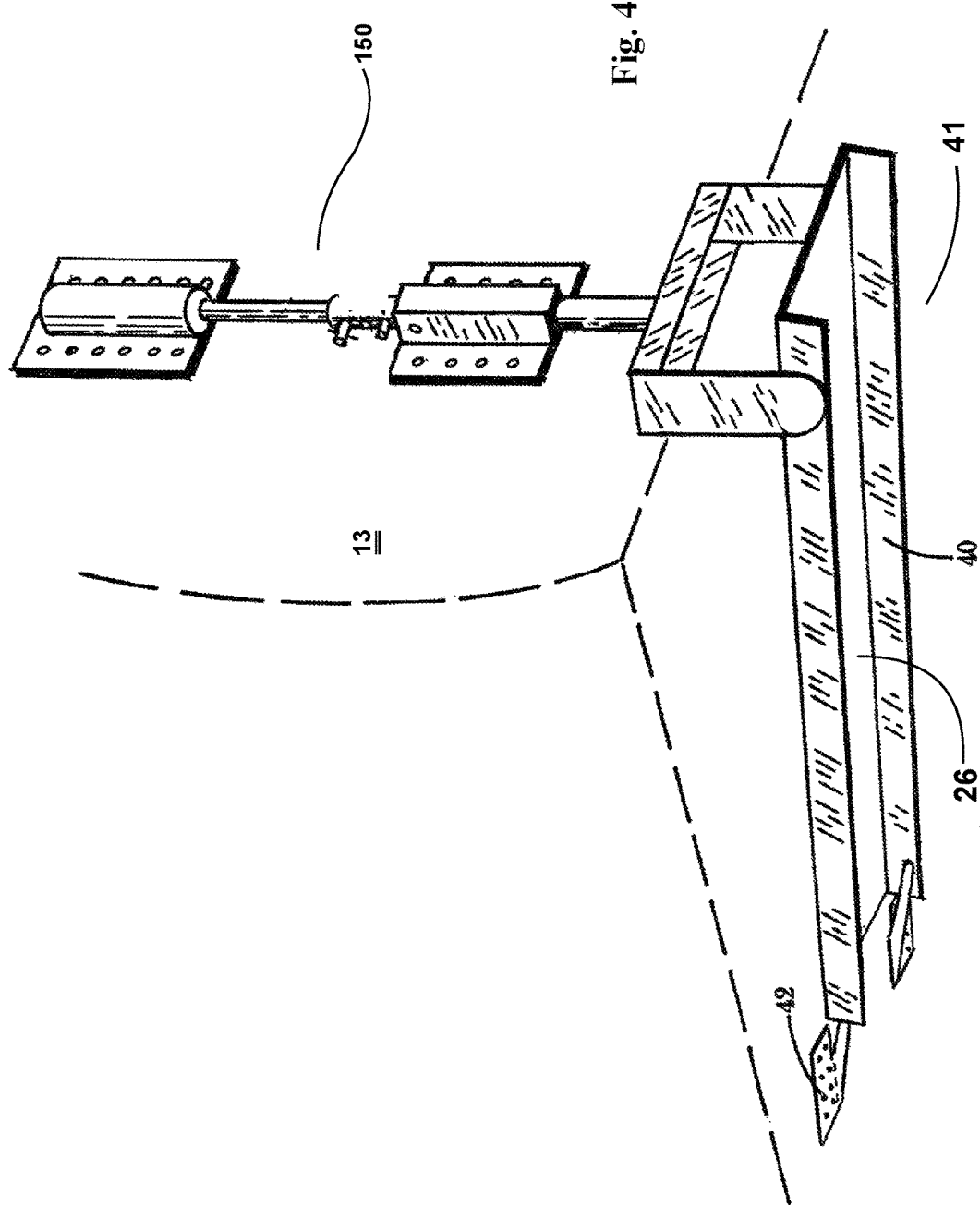
FIG. 4 is an isometric view of a trim tab using a Type-42 Fluid Hinge demonstrating a trim tab in a lowered position.
Figure 5:
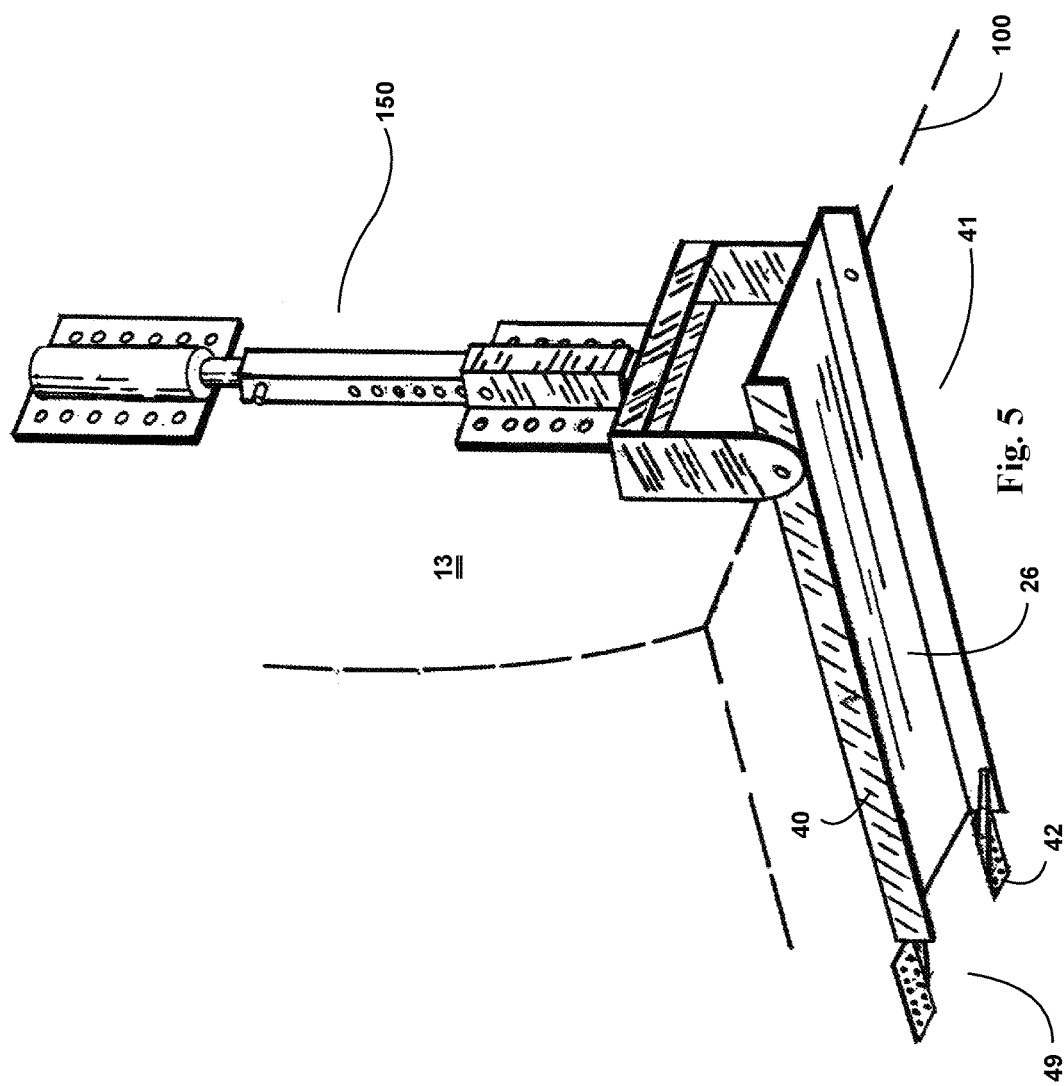
FIG. 5 is an isometric view of a trim tab using a Type-42 Fluid Hinge demonstrating a trim tab in a raised position.
Figure 6:
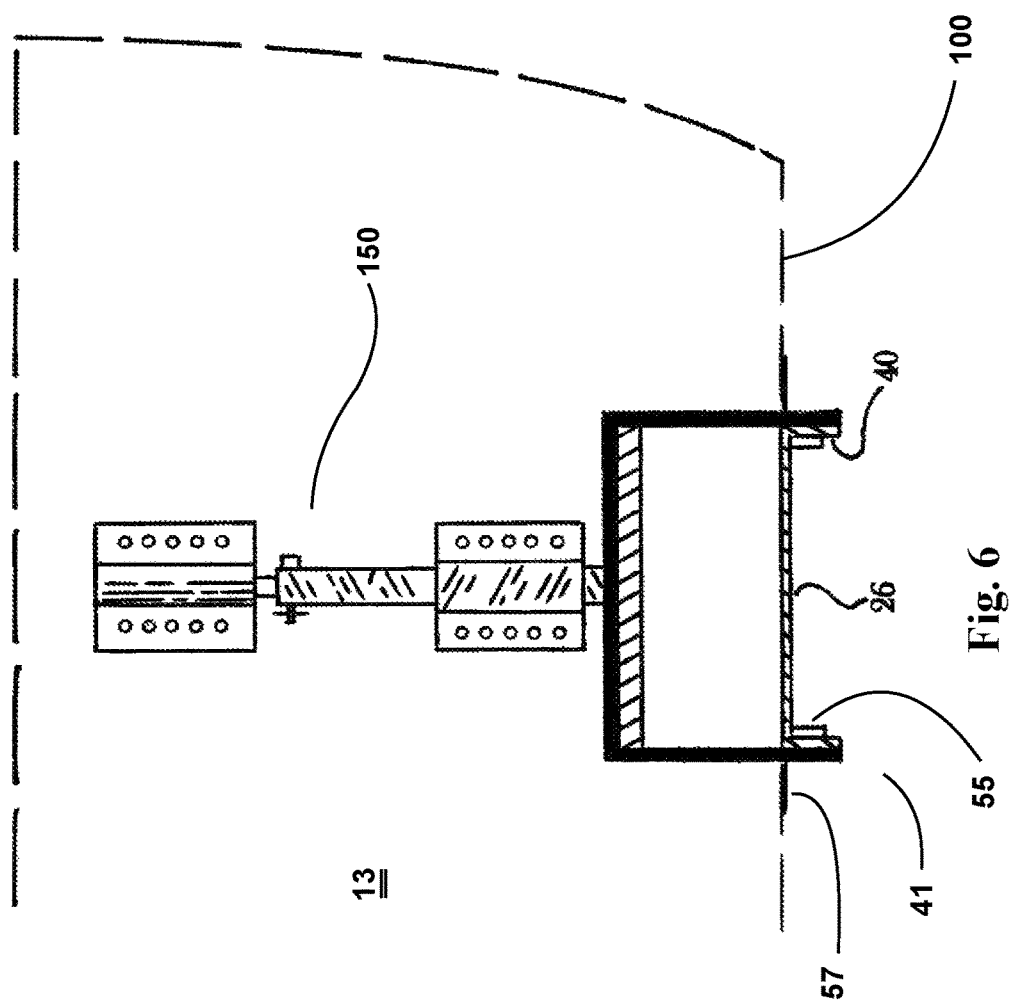
FIG. 6 is a rear view of a Type-42 Fluid Hinge showing the Fluid Hinge in a raised position.
Figure 7:
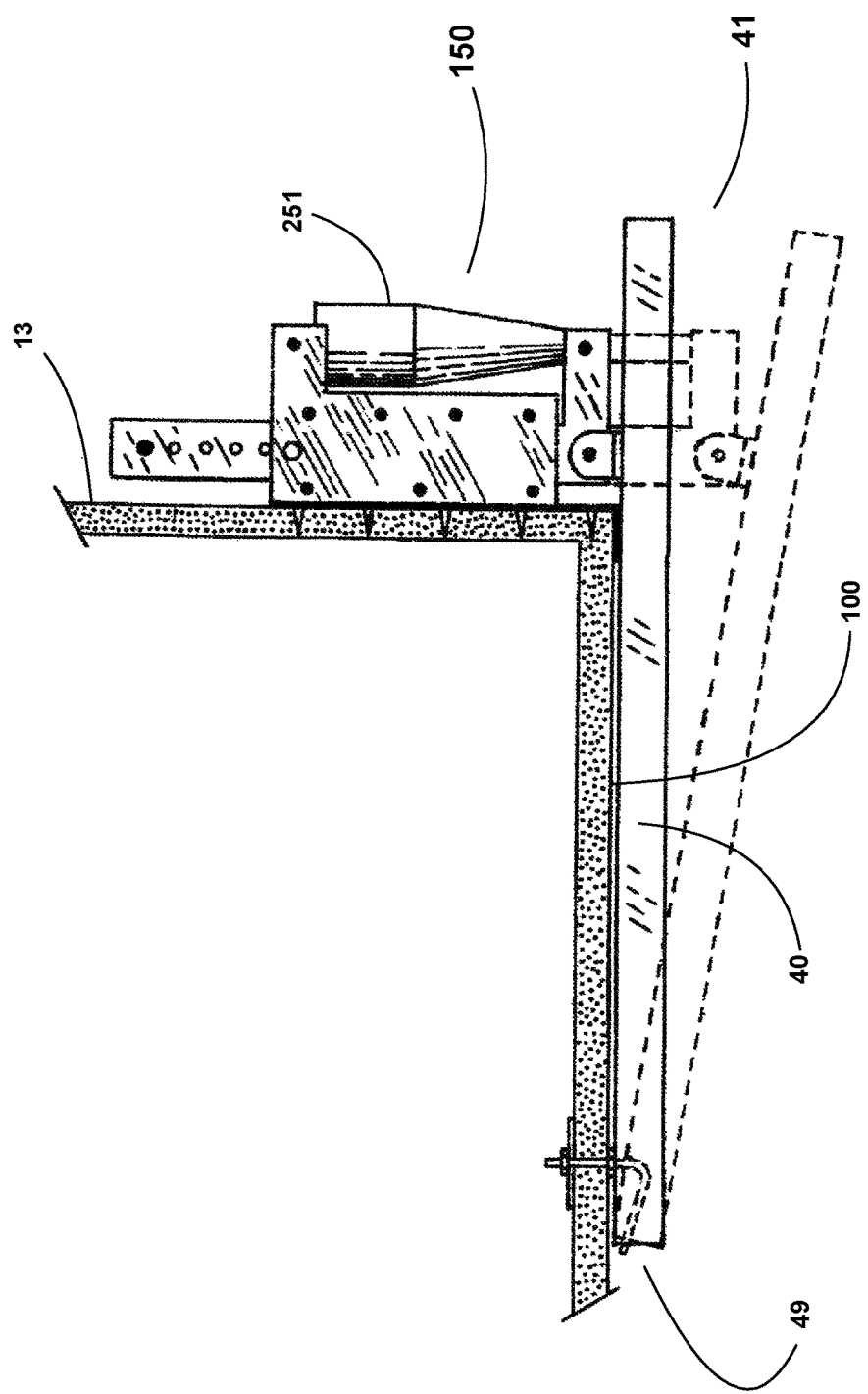
FIG. 7 is a side view of a Type-52 Fluid Hinge showing the relationship of the Fluid Hinge to a raised and lowered trim tab.
Figure 8:
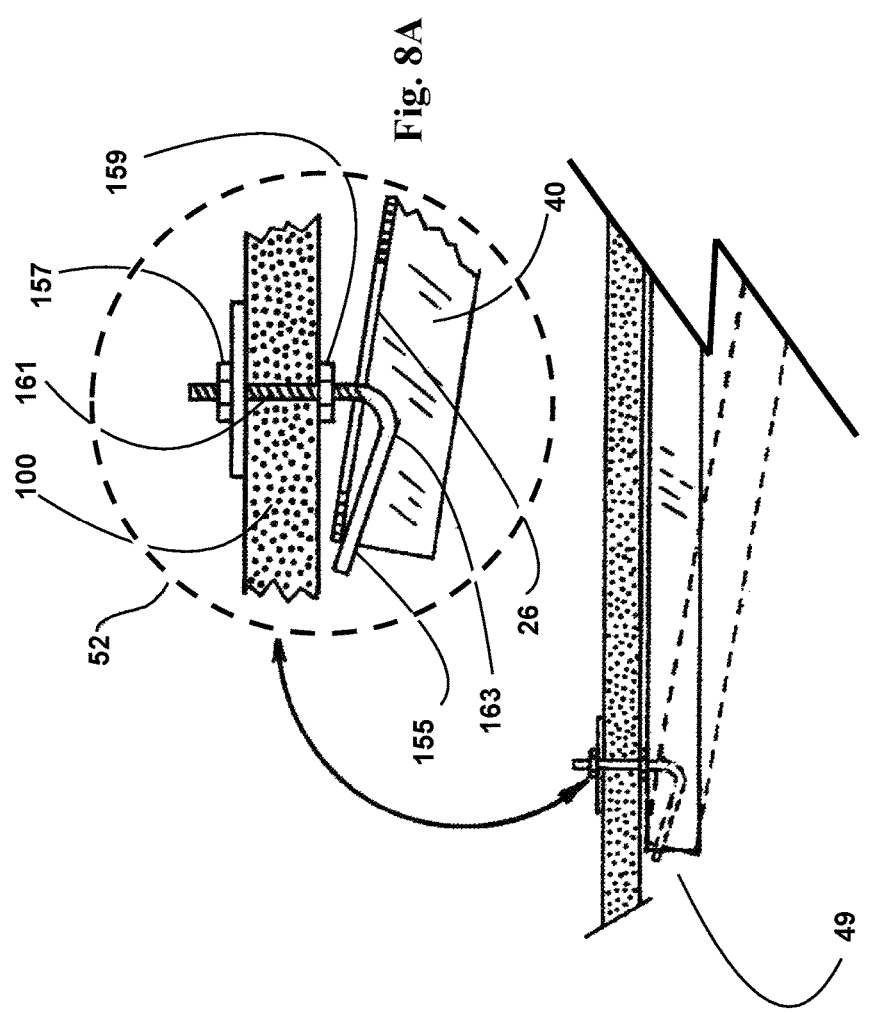

FIG. 4 shows an isometric view from the rear of the watercraft of the planar surface 26 of the trim tab 41 dipped at an angle below the plane parallel to the horizon of the hull 100. It can bee seen that the rear of the planar surface 26 is extended downward from the hull 100 of the watercraft.

Shown in FIGS. 7, 8, 8A, and 9 is fluid hinge Type-52, involving a bent rod 155 with threaded portion 161 connecting the rod 155 to the hull 100, and fastened to the hull 100 of the watercraft by use of a threaded top nut 157 and bottom nut 159. The rod 155 faces the front of the hull 100 and is bent 163 toward the hull 100. This orientation keeps the planar surface 26 of the trim tab 41 from dipping below the plane parallel to the horizon of the hull 100 of the watercraft a low speeds and rest, similar to the hinge of Type-42. The hinge is not physically fixed to the planar surface 26, or any part of the trim tab 41.

Figure 9:
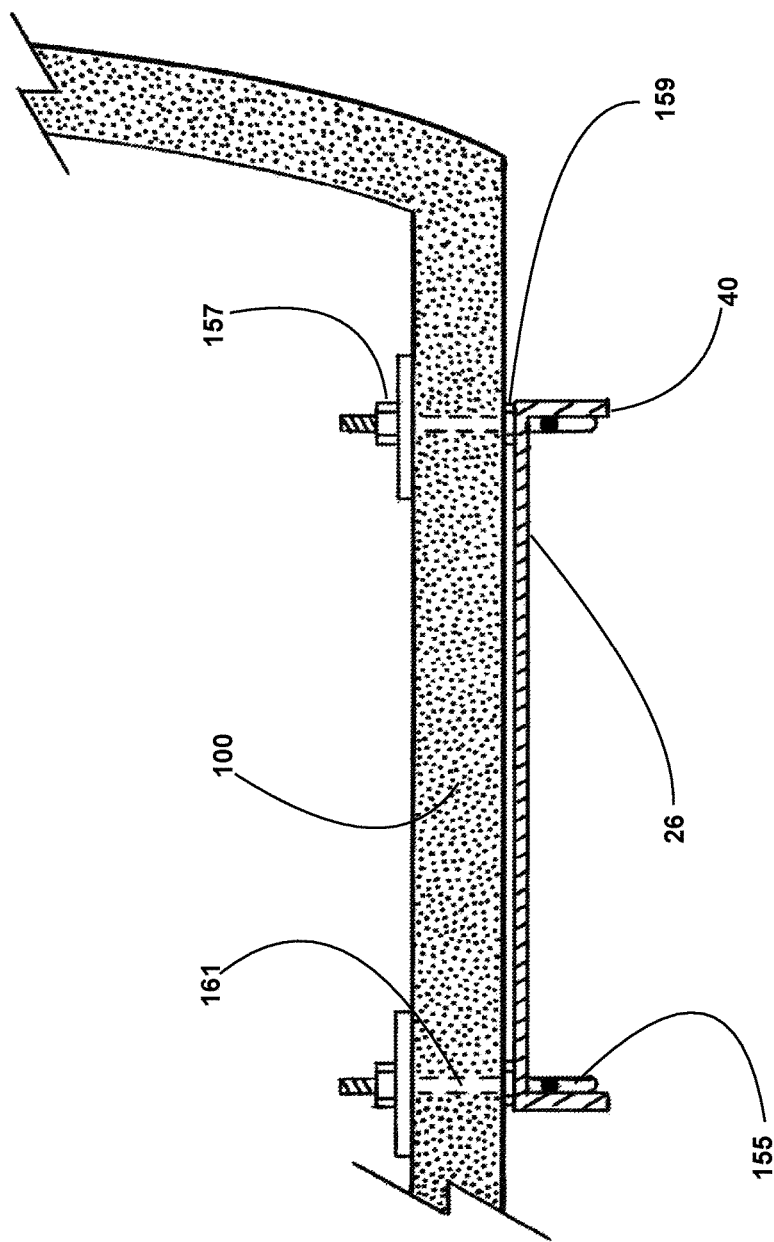
FIG. 9 is a view of a Type-52 Fluid Hinge from the rear of the trim tab showing the connection to the hull.
Figure 10:
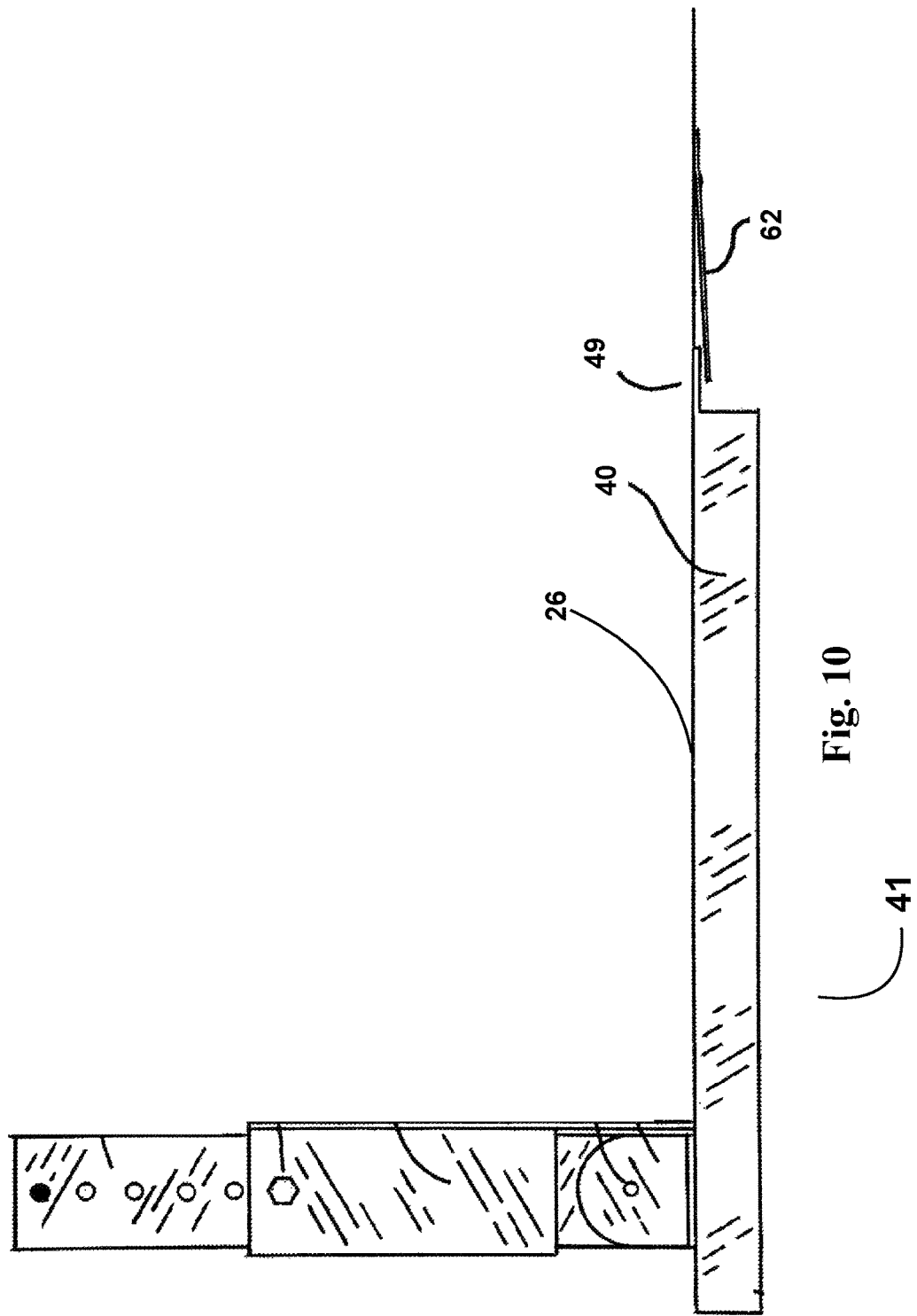
FIG. 10 is a side view of a Type-62 and Type-72 Fluid Hinge.
Figure 11:
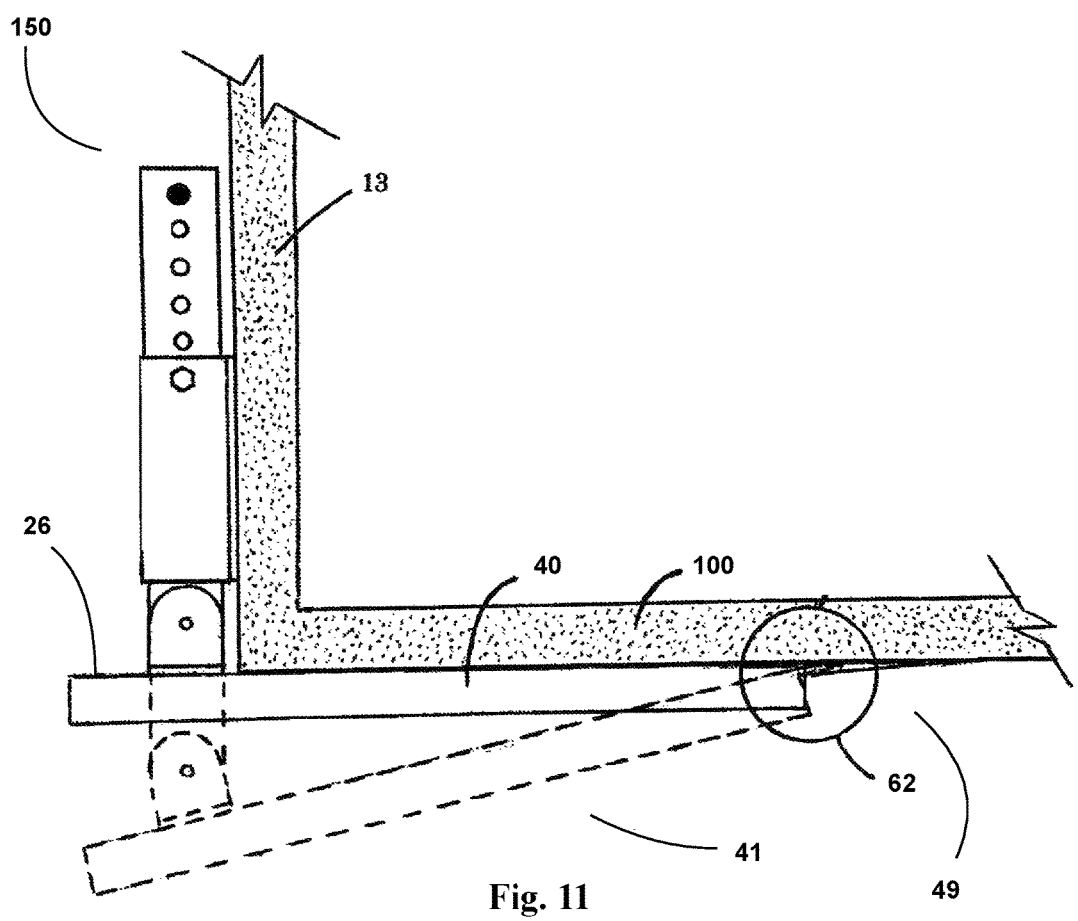
FIG. 11 is a side view of a Type-62 and Type-72 Fluid Hinge showing the pocket and interaction with a trim tab in a lowered and raised position.

FIG. 9 shows a cross sectional rear view of the mounting in more detail.

Figures 12, 12A:
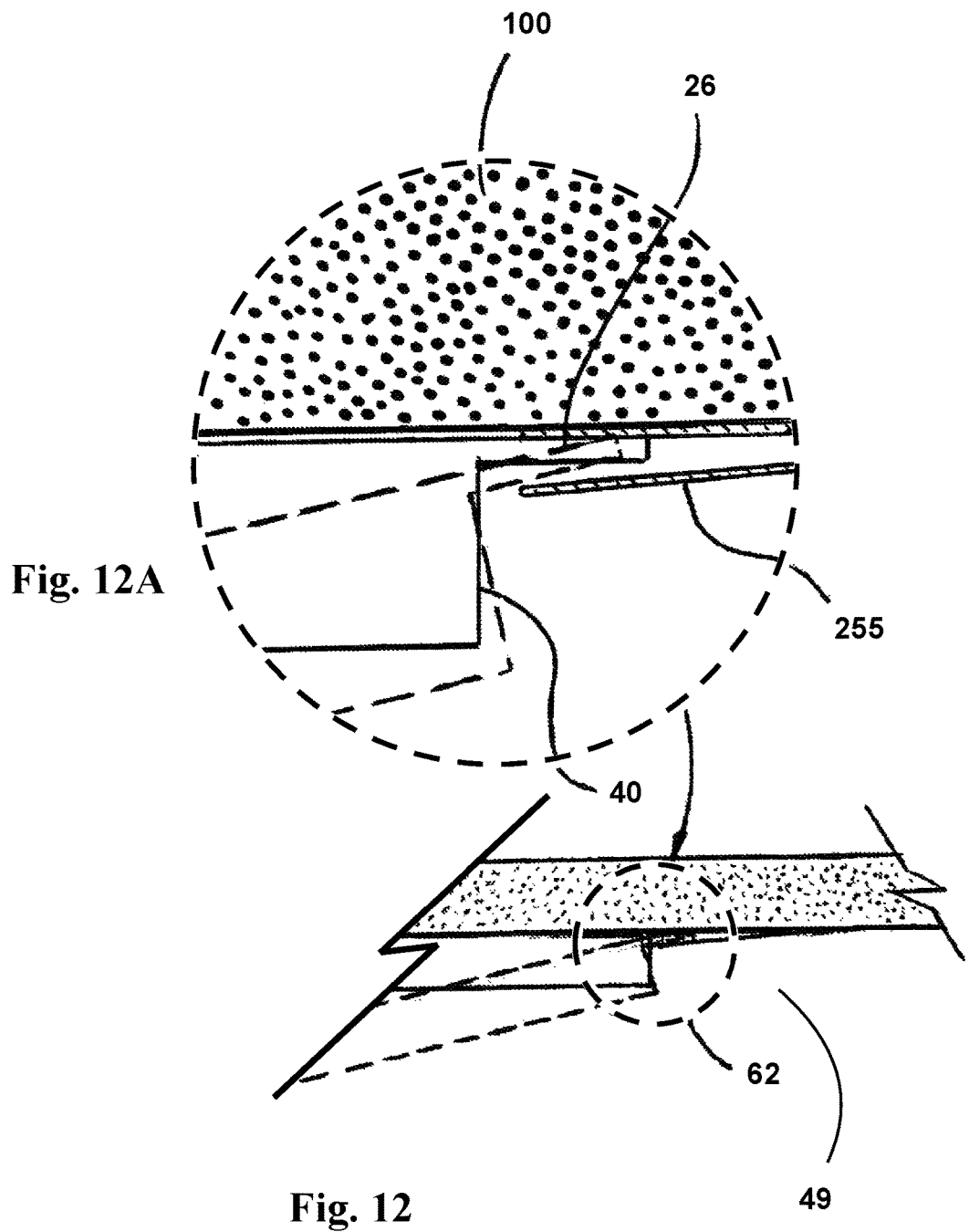
FIGS. 12 and 12A are a side view of a Type-62 and Type-72 Fluid Hinge focused on the parts of the fluid hinge.
Figure 13:
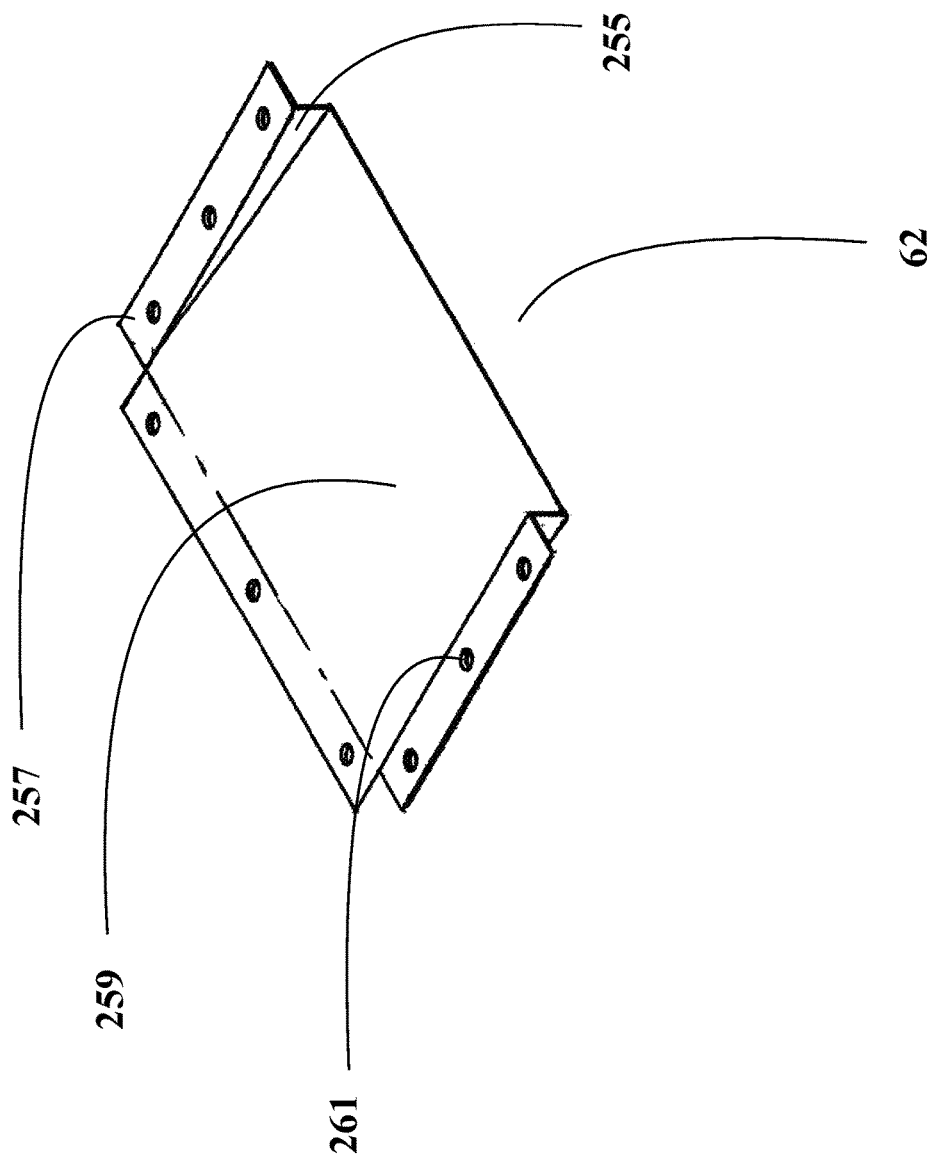
FIG. 13 is a top rear isometric view of the bracket of the Type-62 Fluid Hinge.
Figure 14:
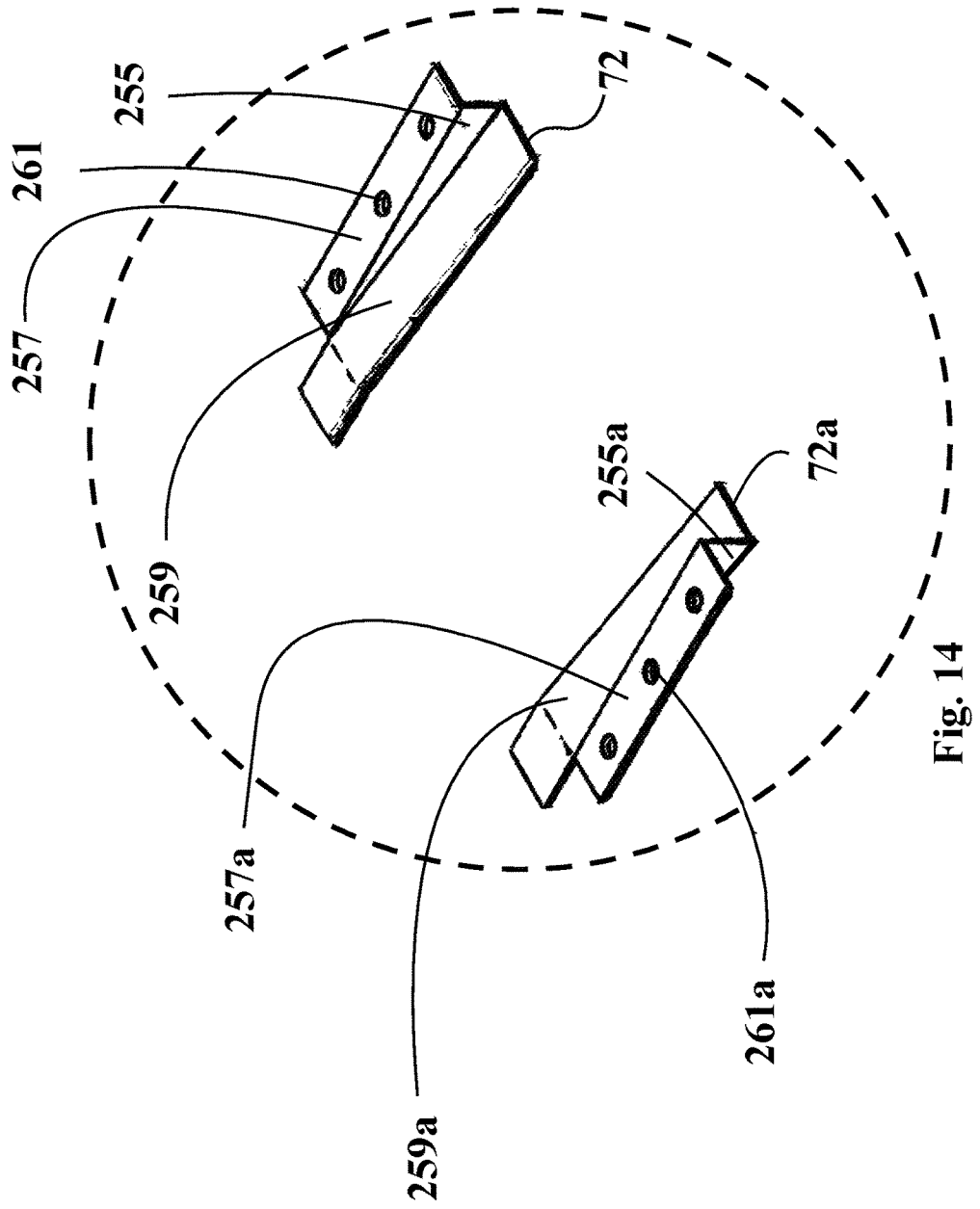
FIG. 14 is a top rear isometric view of the bracket of the Type-72 Fluid Hinge.

FIGS. 10, 11, 12, 12A and 13 show a fluid hinge Type-62 that involves a pocket 255 enclosing a portion of the planar surface 26. This portion of the planar surface 26 extends past the linear-support-tabs 40, as best shown in FIGS. 12 and 12A to provide a complemental insertion to the pocket 255 of the fluid hinge 49 Type-62. This Type-62 pocket keeps the planar surface 26 of the trim tab 41 from dipping below the plane parallel to the horizon of the hull 100 of the watercraft a low speeds and rest, similar to the hinge of Type-42. The hinge is not physically fixed to the planar surface 26, or any part of the trim tab 41. FIG. 13 shows the pocket bracket of Type-62 as a continuous piece, while FIG. 14 shows a similar embodiment 72 and 72a as smaller pieces that perform the same function, but are mounted separately. Both contain a supporting wall 259, side wall 255 to keep the planar surface 26 from moving laterally, a bracket 257 where openings 261 can be used in securement to the hull 100.

Figure 15:
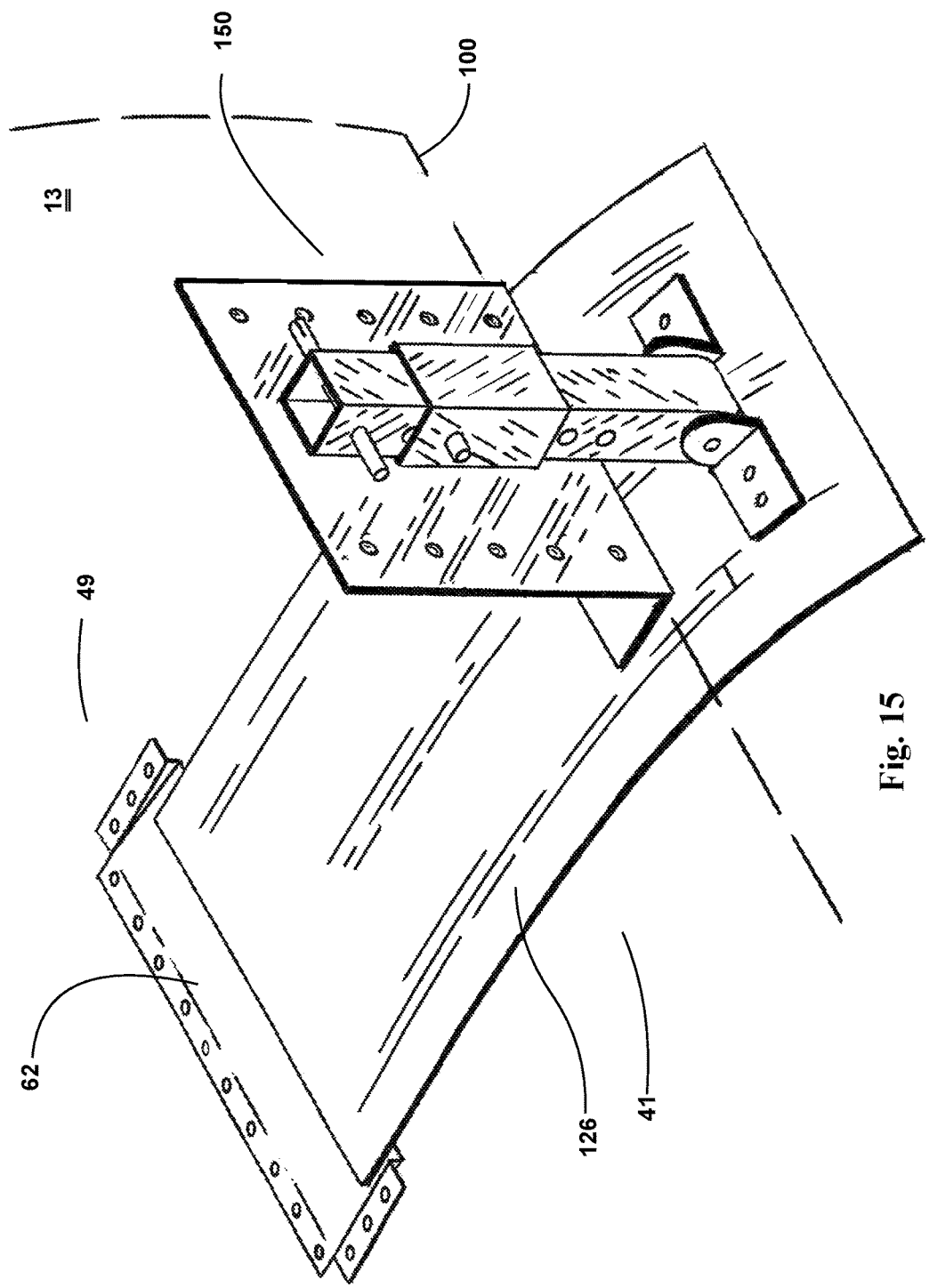
FIG. 15 is a top rear isometric view of the bracket of the Type-62 Fluid Hinge showing the interaction with a trim tab.

In FIG. 15 is shown a flexible planar surface 126 using the fluid hinge Type-62. The pocket of the hinge formed from the bracket of fluid hinge Type-62 and the hull 100 of the watercraft provides support for the flexible planar surface 126 at low speeds and rest. This support keeps the flexible planar surface 126 from dipping below the plane parallel to the horizon of the hull 100. At higher speeds, the planar surface 126 is pushed up against the hull 100 of the watercraft, and there is no need for a hinge. The bracket of fluid hinge Type-62 allows the planar surface 126 to be physically disconnected from any fixed hinging mechanism, which allows the tab 41 to move freely and accomplish its goal.

Figure 16:
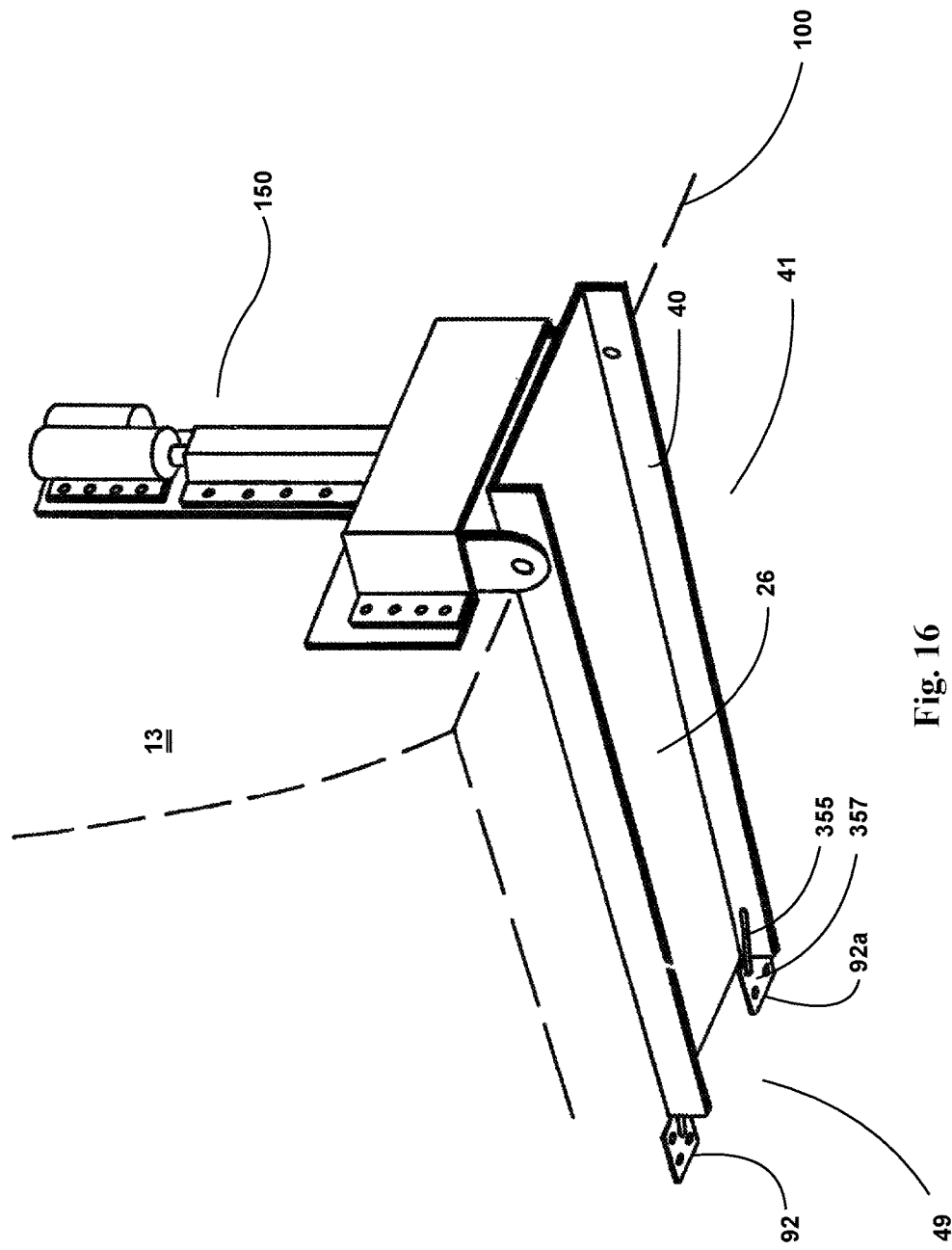
FIG. 16 is a bottom rear isometric view of the bracket of the Type-92 Fluid Hinge showing the interaction with a trim tab in a raised position.

FIG. 16 shows a fluid hinge Type-92 and 92a similar to fluid hinge Type-42. The main difference between the two versions is element 55 in the fluid hinge Type-42 and element 355 in fluid hinge Type-92. Element 355 is a rod that protrudes from a bracket 357. While the look is slightly different, the functionality remains the same. The rod 355 keeps the planar surface 26 of the trim tab 41 from dipping below the plane parallel to the horizon of the hull 100 of the watercraft a low speeds and rest, similar to the hinge of Type-42. The hinge is not physically fixed to the planar surface 26, or any part of the trim tab 41.

Figure 17:
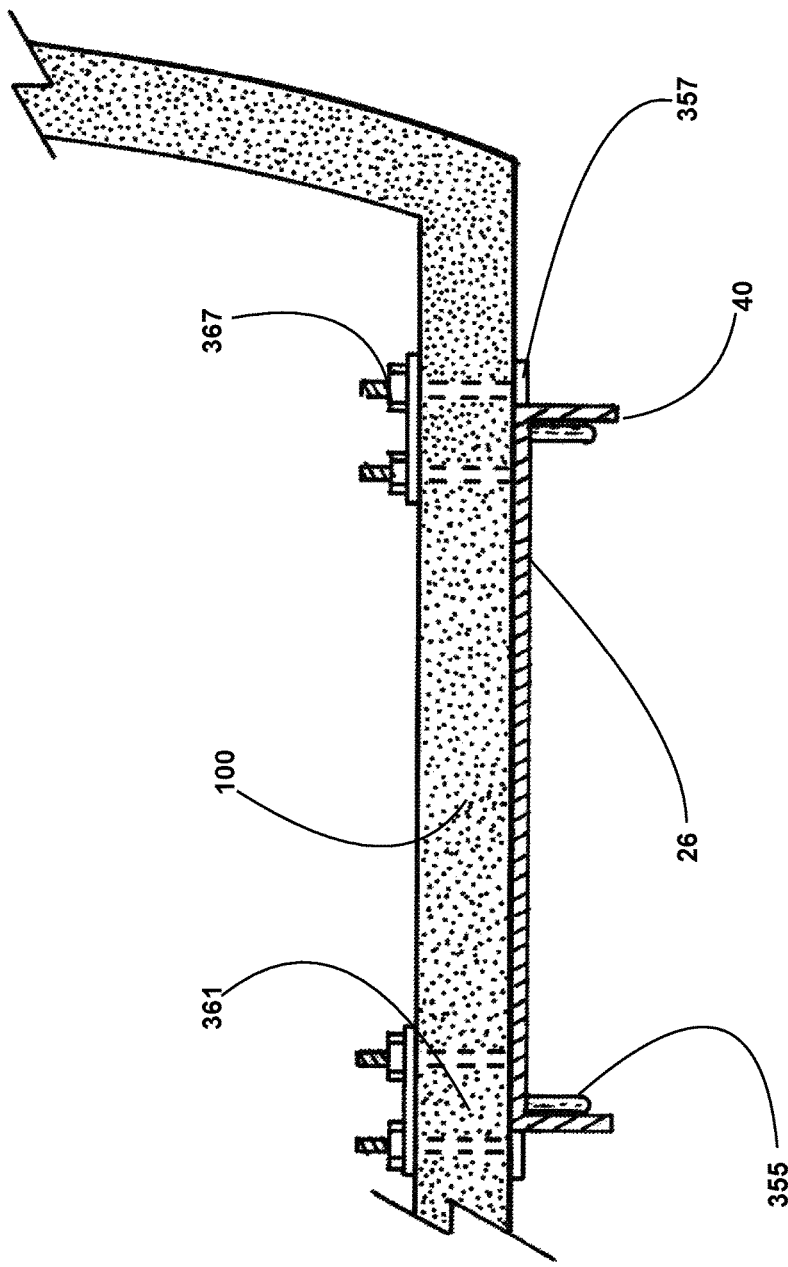
FIG. 17 is a rear cross sectional view showing the securement of the Fluid-Hinge Type-92.

FIG. 17 further shows the mounting of Fluid Hinge Type-92. A series of bolts 361 secure brackets 357 to the hull 100 and are secured by a series of nut 367 inside the hull 100. Noticed is elements 355 do not physically fix the brackets to the substantially planar surface 26 or its sidewalls 40, but abutt the side walls of the trim tab.

Figure 18:
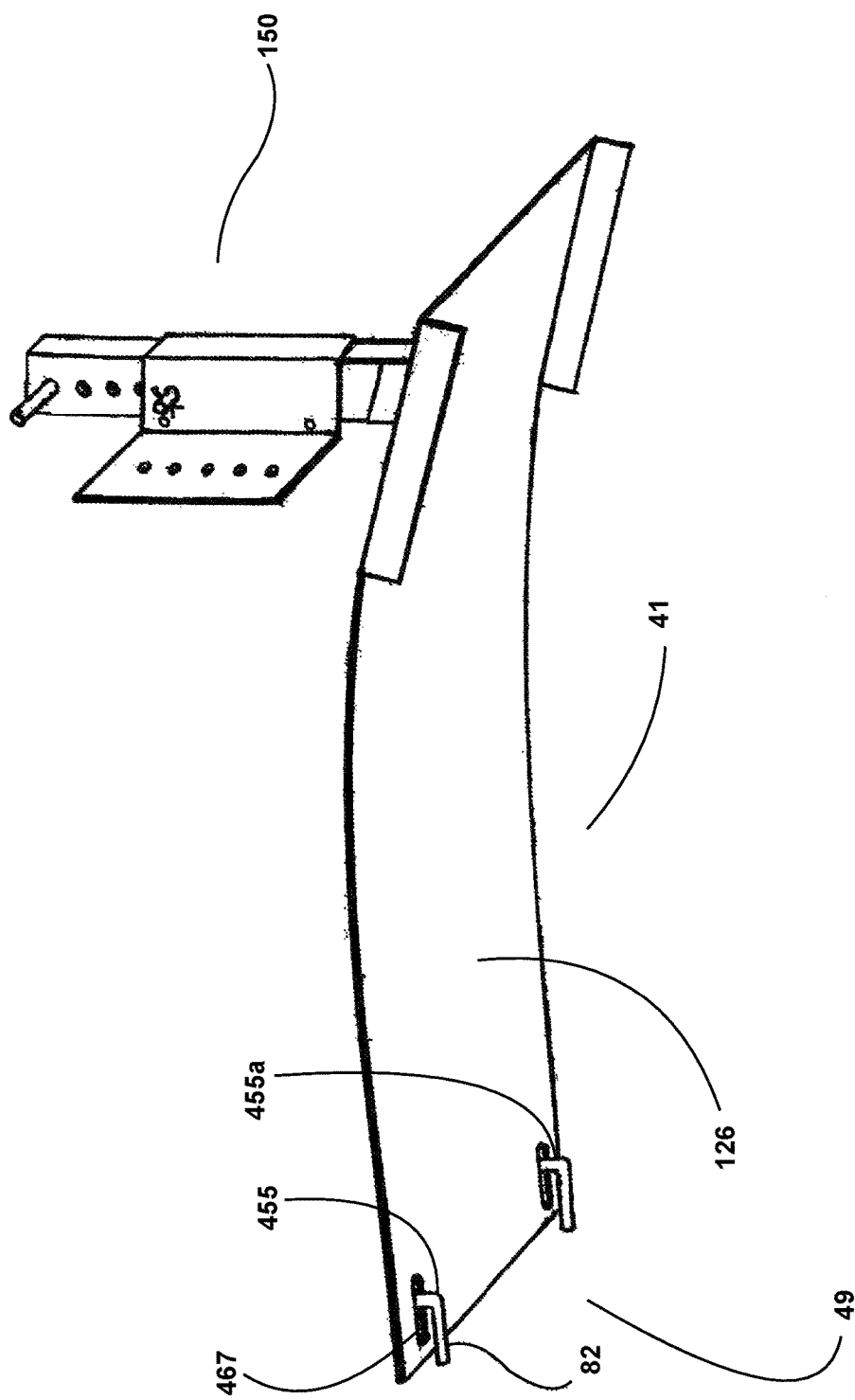
FIG. 18 is a bottom rear isometric view of the bracket of the Type-82 Fluid Hinge showing the interaction with a trim tab.

FIG. 18 shows fluid hinge Type-82. The hinge has two bent rods 455 and 455a connected to the hull 100. FIG. 14 further shows a trim tab 41 with a flexible planar surface 126 made of a flexible material. The fluid hinge Type-82 is used to secure the flexible surface 126, but may also be used to secure the planar surface 26 as shown in previous Figs. The rods work as a hinge, allowing the surface to be secured to the hull, but not physically fixed. The rods extend through a hole 467 of the planar surface to keep the surface secured, but allows the surface 126 or 26 to move freely when an actuator 150 pushes down on the rear of the tab. The fluid hinge Type-82 also keeps the front of the surface 126 or 26 of the trim tab 41 from dipping below the plane parallel to the horizon of the hull 100 of the watercraft when the watercraft is at low speeds or rest.

Figure 19:
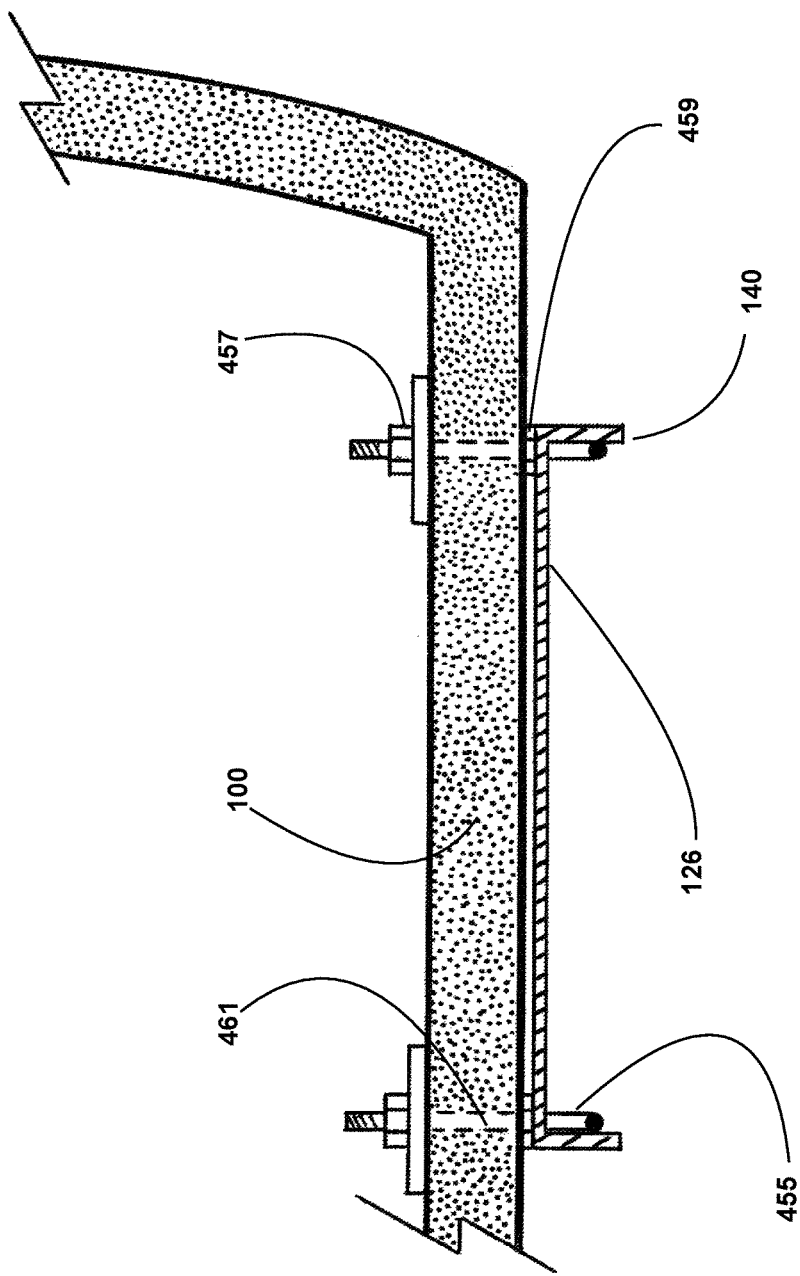
FIG. 19 is a rear cross sectional view showing the securement of the Fluid-Hinge Type-82.

FIG. 19 further shows the mounting of Fluid Hinge Type-82. A threaded rod 461 runs through to the hull 100 and is secured by a nut 457 inside the hull 100. Noticed is elements 455 do not physically fix the rod 455 to the flexible surface 126, but fits in a hole 467 (as shown in FIG. 18) provided for the rod 455 to fit through, and further allows the flexible surface 126 to rest at low or no speeds.

While there has been shown and described above the preferred embodiment of the instant method it is to be appreciated that the method may be embodied otherwise than is herein specifically shown and described and that, within said method, certain changes may be made in the form and arrangement of the parts without departing from the underlying ideas or principles of this method as set forth in the Claims appended herewith.

I claim:

1. A fluid hinge system, comprising:
   (a) a two part system having a substantially planar surface of a trim tab and at least one shelf-like containment bracket secured to the underside of a hull of a watercraft on which the substantially planar surface of the trim tab may rest;
   (b) said substantially planar surface lacking a physically fixation to the at least one containment shelf-bracket wherein the at least one containment shelf-bracket is without any load from the substantially planar surface other than at rest keeping the substantially planar surface from descending below a plane parallel to a horizon of the hull; and
   (c) said substantially planar surface allowing for forward and aft slidability allowing the planar surface to slide and move with the current system depending on an angle between the substantially planar surface and the hull of said watercraft.

2. The system of claim 1, further comprising:
   the at least one bracket having two brackets located at distal ends of a span of the trim tab;
   each of the two brackets having a flange mounted to the hull ears mounted to the flange and extending in a downwardly direction;
   a channel with two sidewalls attached to the substantially planar surface and extending in the downwardly direction of the substantially planar surface of the trim tab; and
   said ears abutting the inside walls of said channel.

3. The system of claim 2, further comprising:
   said ears extending in the downward direction on an angle less than 90 degrees from the bracket that allows the substantially planar surface to rest on the ears.

4. The system of claim 1, further comprising:
   the at least one bracket having two brackets located at distal ends of a span of the trim tab;
   each of the two brackets having a threaded rod extending downwardly;
   said rod extending through the hull and secured to the hull with a nut on the inside of the hull and a nut on the outside of the hull;
   said downwardly extending rod curving to bring the rod to a forward-pointing position; and
   said forward-pointing position holds the substantially planar surface about parallel to the hull.

5. The system of claim 1, further comprising:
   the at least one bracket using a single bracket having a pocket in combination with the hull;
   the pocket having a width slightly larger than the span of the trim tab;
   the bracket having a flange located at distal ends of the span of the bracket;
   the opening of the pocket opening toward the stern;
   the pocket contains a lip of the substantially planar surface between a bottom surface of the pocket, the surface of the hull; and
   two sidewalls to allow movement but contain the substantially planar surface at low to now speed from descending below the plane parallel to the horizon of the hull.

6. The system of claim 1, further comprising:
   the at least one bracket using two brackets mounted to the hull;
   each of said brackets having a wall on one side with a mounting flange and an absence of a sidewall on an opposing parallel side;
   said absence of a sidewall faces an opposing absence of a sidewall from a complementary bracket;
   said brackets occurring at a width slightly larger than distal ends of a span of said planar surface;
   said bracket holding the planar surface between a lower flap and the hull; and
   the bracket allows the planar surface to move, but the planar surface is unable to slip completely out of the pocket.

7. The system of claim 1, further comprising:
   the at least one bracket having two brackets located near the distal ends of the span of the trim tab, penetrating the planar surface of the trim tab;
   said two brackets mounted to the hull;
   each of the two brackets having a flange mounted to the hull;
   each of the two brackets having a rod extending downwardly and terminating in an about 90 degree bend;
   the about 90 degree bend directing the rod to a bow-facing direction in an orientation about parallel to the hull; and
   the rods contain the substantially planar surface and allowing movement of the planar surface.

8. The system of claim 1, further comprising:
   the at least one bracket having two brackets located at the distal ends of the span of the trim tab;
   said two brackets mounted to the hull;
   each of the two brackets having a flange to be mounted to the hull;
   each of the two brackets having a rod extending toward the stern; and
   each of the two rods mounted at an angle less than 90 degrees from the hull to contain the substantially planar surface.

* * * * *